United States Patent [19]

Sasaki et al.

[11] Patent Number: 4,930,380
[45] Date of Patent: Jun. 5, 1990

[54] METHOD OF REPAIRING ROLLS OF ROLLING MILL AND ROLL CUTTING APPARATUS

[75] Inventors: Takeshi Sasaki, Chita; Yoshio Takakuwa, Ichinomiya; Takayuki Haruna, Chita; Kiyoharu Yamada, Tohkai, all of Japan

[73] Assignee: Daidotokushuko Kabushikikaisha, Japan

[21] Appl. No.: 222,857

[22] Filed: Jul. 22, 1988

[30] Foreign Application Priority Data

Jul. 24, 1987 [JP] Japan ................. 62-185970

[51] Int. Cl.⁵ ............................................ B21B 27/04
[52] U.S. Cl. .......................................... 82/117; 82/11; 72/236
[58] Field of Search ................. 72/236; 269/60; 82/11, 82/12, 13, 18, 19, 2 R, 2.5, 4 R, 4 A, 4 B, 4 C, 4 D, 4 E

[56] References Cited

U.S. PATENT DOCUMENTS

| | | | |
|---|---|---|---|
| 349,806 | 9/1886 | McIntosh | 72/236 |
| 3,022,690 | 2/1962 | Binn | 82/2 R |
| 3,069,935 | 12/1962 | Garvin | 269/60 |
| 3,095,770 | 7/1963 | Binns | 82/2 R |
| 3,168,846 | 2/1965 | Binns | 82/2 R |
| 3,330,074 | 7/1967 | Stuckey | 82/39 |
| 3,638,933 | 2/1971 | Burnette et al. | 269/60 |
| 4,548,064 | 10/1985 | Bohnenkamp | 72/236 |
| 4,586,864 | 5/1986 | Muraguchi et al. | 269/60 |

Primary Examiner—Frederick R. Schmidt
Assistant Examiner—Blynn Shideler
Attorney, Agent, or Firm—William A. Drucker

[57] ABSTRACT

When rolls in a rolling mill are repaired, a roll stand is first dismounted from the rolling mill. Then the dismounted roll stand is secured and the rolls are brought near to a housing of the roll stand in the axial direction of the roll. In this situation the rolls are cut. After the rolls have been cut, the roll stand is released from being secured. Then the roll stand is mounted on the rolling mill.

A cutting apparatus used for cutting rolls comprises a base frame and a stand mounted on the base frame for placing the roll stand thereon. The housing of the roll stand placed on the stand is secured against the base frame. Furthermore, the rolls of the roll stand are brought near to the housing in the axial direction of the roll and are located. In the situation located against the housing, the rolls are rotated by a roll rotating apparatus and cut with a cutting tool.

3 Claims, 7 Drawing Sheets

METHOD OF REPAIRING ROLLS OF ROLLING MILL AND ROLL CUTTING APPARATUS

BACKGROUND OF THE INVENTION

1. Field of the Invention

This invention relates to a method for repairing the worn rolls of a rolling mill and to an apparatus for cutting the rolls for repairing.

2. Description of the Prior Art

A rolling mill comprises a roll stand mounted on a base frame and a drive apparatus for driving rolls. The roll stand comprises a housing and a pair of rolls supported rotatably in roll bearings carried by the housing. The pair of rolls are provided with grooves for defining calibers for rolling operation. The housing of the roll stand of this type is secured at a prescribed place on the base frame. The rolls are brought near to the housing in the direction parallel to the axis of the rolls and consequently are located against the housing in an accurate manner. As a result, the caliber is accurately located along a line where a material to be rolled is passed.

The material is rolled while the rolls are rotated by the drive apparatus and the material transferred along the line is passed through the caliber.

When the rolls get worn it becomes difficult to roll the material into a prescribed form.

Accordingly, the grooves are regularly repaired at the inventors' company.

The above mentioned repairing work is carried out as follows. Namely, a roll stand 2e as shown in FIG. 13A is first dismounted from a rolling mill. Then a roll 5e as shown in FIG. 13B is dismounted from a housing 4e of the roll stand 2e. As seen in the figure, a roll bearing 6e and a joint 17e are still attached to the roll 5e. Next, the joint 17e and the roll bearing 6e are dismounted from the roll 5e and the roll 5e is separated as a single member as shown in FIG. 13C. In the next place, the roll 5e is set on a lathe 31e as shown in FIG. 13D and a groove 15e is cut into a prescribed form. After rolls have been cut, the roll stand 2e is again assembled as shown in FIG. 13A in a order of works exactly reverse to the above mentioned order. In the case of this assembling work, the roll 5e must be correctly located against the housing 4e from the above mentioned rolling circumstance. Thus the assembling work must be carried out very carefully. The roll stand 2e assembled in this manner is mounted on the rolling mill.

However, the man-hour for the above mentioned repairing work is considerably large. Therefore the personnel expenditure runs up. Besides it takes much time to repair the rolls.

SUMMARY OF THE INVENTION

Then it is an object of the present invention to provide a repairing method by which a worn roll can be repaired with reduced man-hour. The smaller man-hour has a merit that the personnel expenditure is the less. It has also a merit that the time required for the repairing work and therefore the period out of operation of the rolling line can be decreased.

Another object of the present invention is to provide an apparatus with which a groove can be cut on the roll in the repairing work with the roll mounted on the housing. Moreover it is still another object of the present invention to provide an apparatus with which the roll can be cut in a prescribed positional relationship with respect to the housing. If the roll, which is mounted in and located against the housing, can be cut in this manner, the cutting work can be carried out only by dismounting the roll stand from the rolling mill and mounting it directly on the cutting apparatus according to the present invention. As a result, the above mentioned reduction of man-hour can be attained.

DETAIL DESCRIPTION OF THE PREFERRED EMBODIMENT

Figure 1:
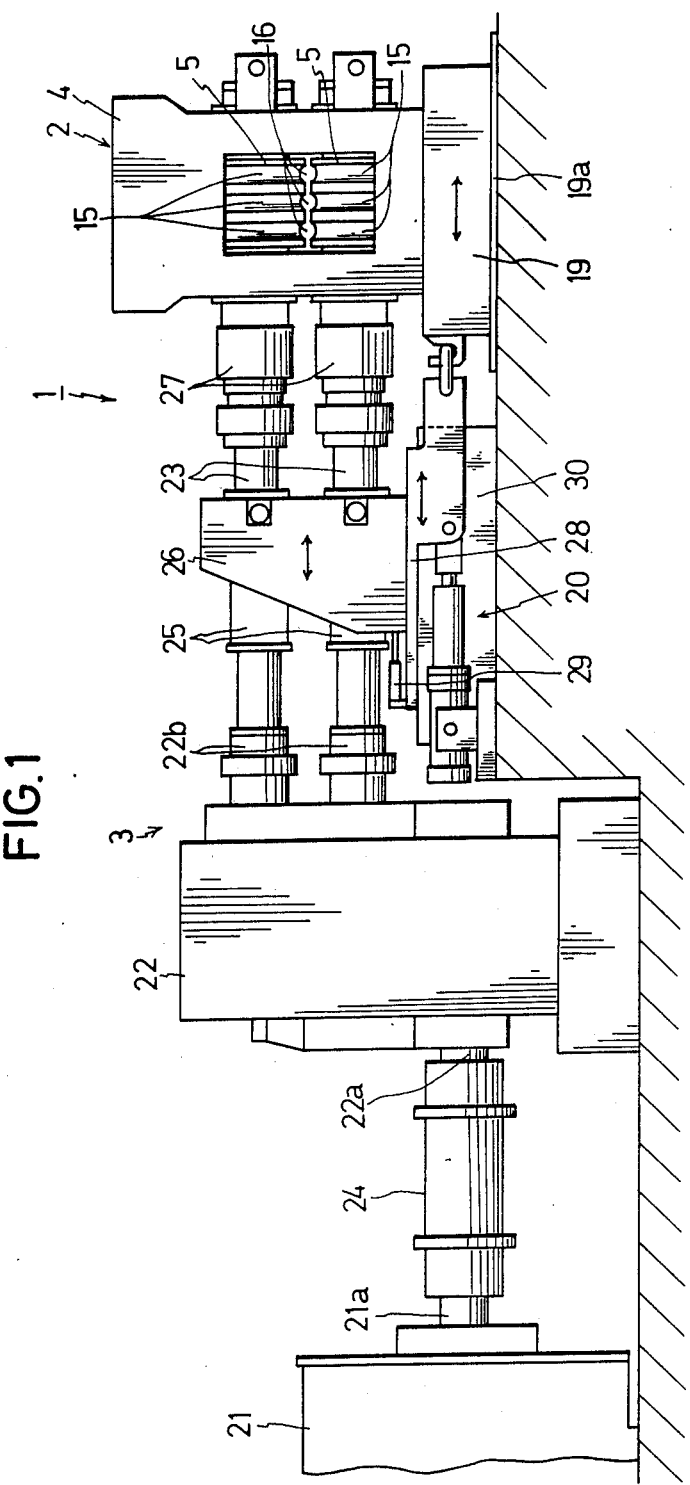
FIG. 1 is a front elevational of a rolling mill.
Figure 2:
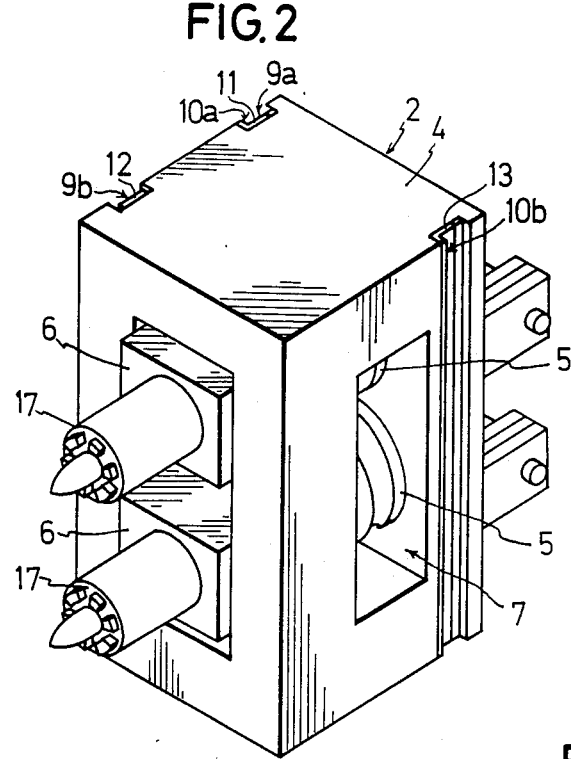
FIG. 2 is a perspective view of a roll stand.
Figure 3:
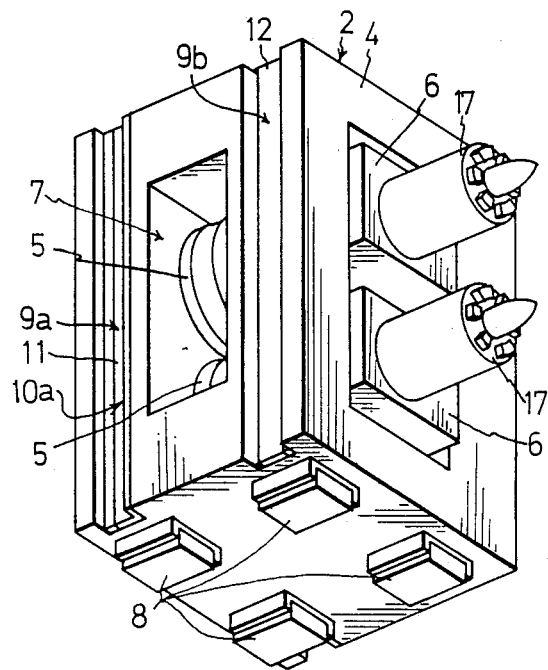
FIG. 3 is a perspective view of the roll stand taken in a direction different from that of FIG. 2.

FIG. 1 shows a usually known rolling mill 1. The rolling mill 1 comprises a roll stand 2 and a drive apparatus 3. As shown in FIGS. 2 and 3, the roll stand 2 includes a housing 4 and a pair of rolls 5 and 5 each of which is rotatably mounted in a respective roll bearing 6 carried by the housing 4. The housing 4 is formed with an opening 7 through which a material to be rolled is passed and is provided, on the bottom surface thereof, with legs 8. The housing 4 is provided with also basing seats for working 9a, 9b and 10a, 10b. As shown in details in FIGS. 9 through 11, these basing seats are formed with the surfaces of firm metallic seat plates 11, 12 and 13 secured in depressions on the housing. The pair of rolls 5 and 5 are formed with respective grooves 15 and 15. A pair of confronting grooves of the rolls form a caliber 16. In some cases, each of the rolls is formed with only one groove 15. A joint 17 for drive apparatus is connected to one end of each roll 5. As shown in FIG. 1, the above mentioned roll stand 2 is dismountably secured with a clamp means (not shown) on a truck 19 adapted to displace on a base frame 19a in the direction shown by an arrow. A shift apparatus 20 is connected to the truck 19 in order to shift the same in the direction shown by the arrow. In the case of a rolling mill including rolls formed with only one respective groove, the truck 19 and the shift apparatus 20 are unnecessary.

The drive apparatus 3 comprises an electric motor 21, a pinion stand 22 and a pair of roll drive shafts 23 and 23. An input shaft 22a of the pinion stand 22 is connected to a rotor shaft 21a of the electric motor 21 by a joint 24 and a pair of output shafts 22b and 22b are connected to the drive shafts 23 and 23 respectively by expansion joints 25 and 25. The roll drive shaft 23 is supported by a bearing means 26 and is connected, at one end thereof, with a joint 27 for the roll stand. The bearing means 26 is mounted on a slide table 28 for displacement relative to the table in the direction shown by the arrow. A hydraulic cylinder 29 is mounted on the table 28 and the piston rod of the cylinder is connected to the bearing means 26. The slide table 28 is disposed on a stand 30 for displacement in the direction shown by the arrow. This table is connected to the above mentioned shift apparatus 20.

The operation of the above mentioned rolling mill 1 is as follows. The bearing means 26 is advanced towards the roll stand 2 as the hydraulic cylinder 29 is expanded and the joint 27 is connected to the joint 17. In this case, the expansion force of the cylinder 29 biases the rolls 5 in the axial direction thereof against the housing 4. As a result, the rolls 5 are brought near to the housing in the axial direction. Consequently, the axial play of the roll 5 against the housing 4 is eliminated. Namely, the roll 5 is located against the housing 4. The roll stand 2 is shifted in the axial direction of the roll by the shift apparatus 20. As a result, one of the plural calibers 16 is brought on the passage line of a material to be rolled. When the electric motor 21 is put into operation in this situation, the torque of the electric motor is transmitted to the rolls 5 through the pinion stand 22 and the roll drive shaft 23 and the rolls 5 are rotated. With the rolls rotated, the material to be rolled is passed through the caliber 16 and is rolled.

When the rolls 5 are worn after repeated works of the above mentioned rolling, it becomes necessary to repair the rolls or grooves. FIGS. 4 through 11 show a roll cutting apparatus 31 used for repairing the rolls.

The roll cutting apparatus includes a base frame 32. On the base frame 32 are mounted a stand 33 to place the roll stand 2 thereon, a housing locating means 35 for locating the housing 4 of the roll stand 2 against the base frame 32, a securing means 36 for securing the housing 4, a roll locating means 37 for bringing the rolls 5 near to the secured housing 4 and locating the rolls 5 against the housing 4, a roll rotating means 38 for rotating the rolls 5, an operation mechanism 39 for operating a cutting tool 90 for cutting rolls, an elevator 40 for raising and lowering the stand 33 and so on.

The base frame 32 comprises a machine bed 42 provided with an opening 43, an upper frame 44 mounted over the machine bed 42, upright frames 45a through 45c, a mount 46 for the drive apparatus, a mount for the operation mechanism of the cutting tool, a lower frame 48 mounted under the machine bed 42 and so on.

Figure 4:
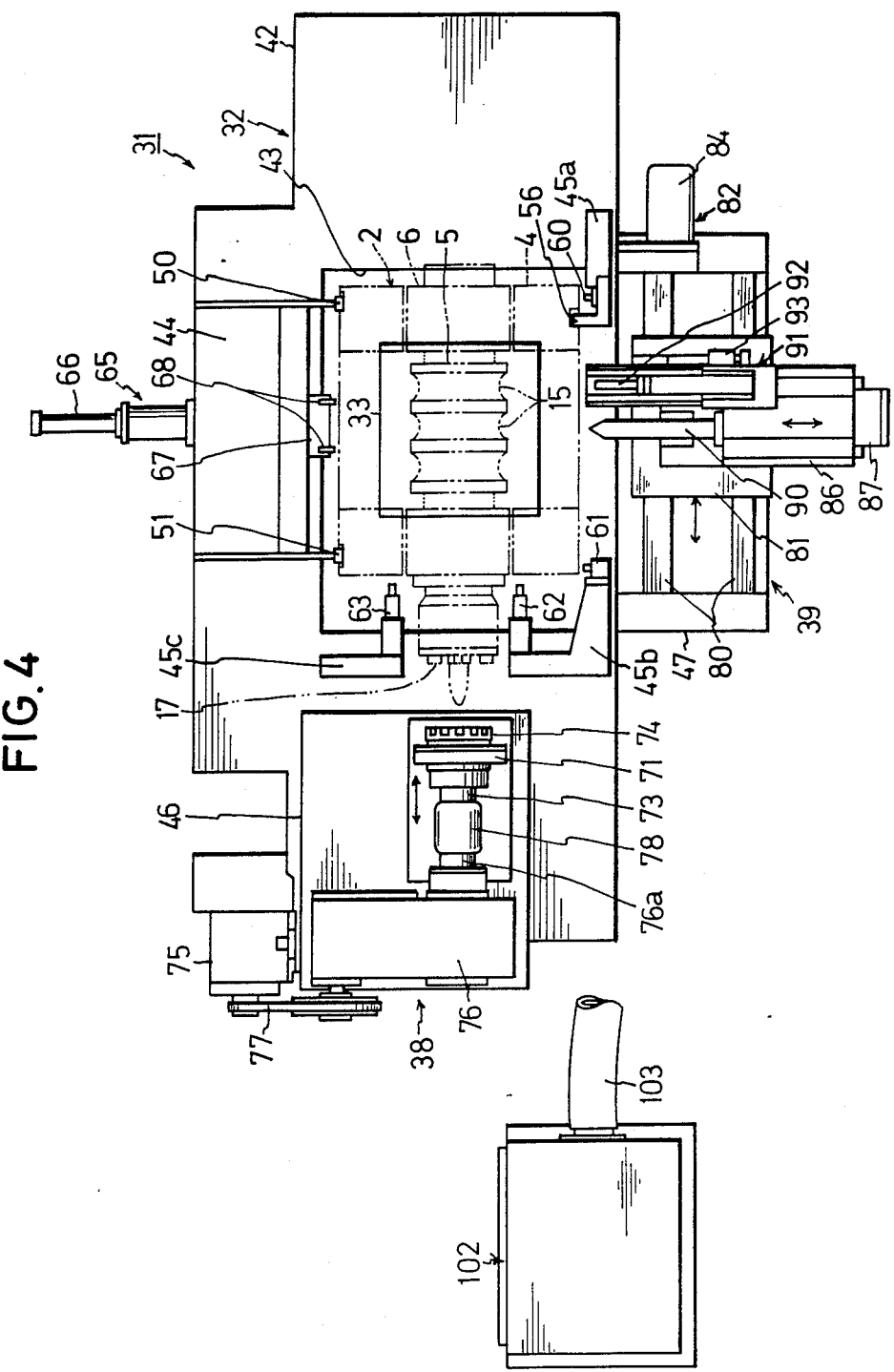
FIG. 4 is a plan view of a roll cutting apparatus with the roll stand not yet mounted.
Figure 5:
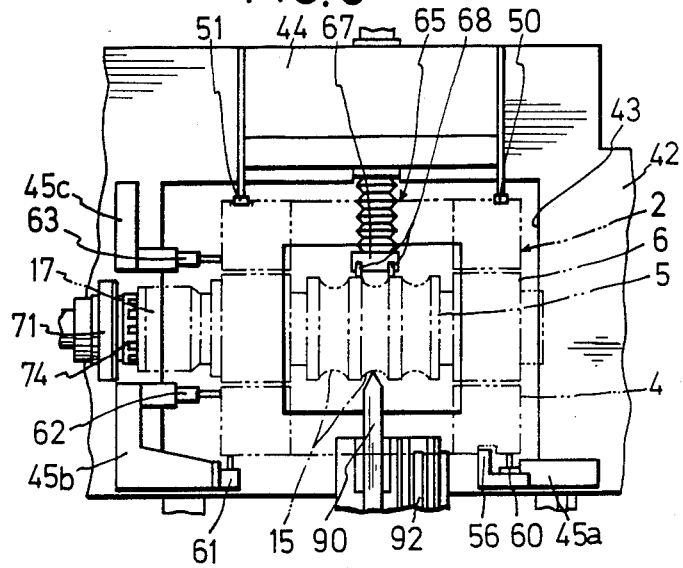
FIG. 5 is a partial plan view showing the roll cutting apparatus while the roll is cut.
Figure 7:
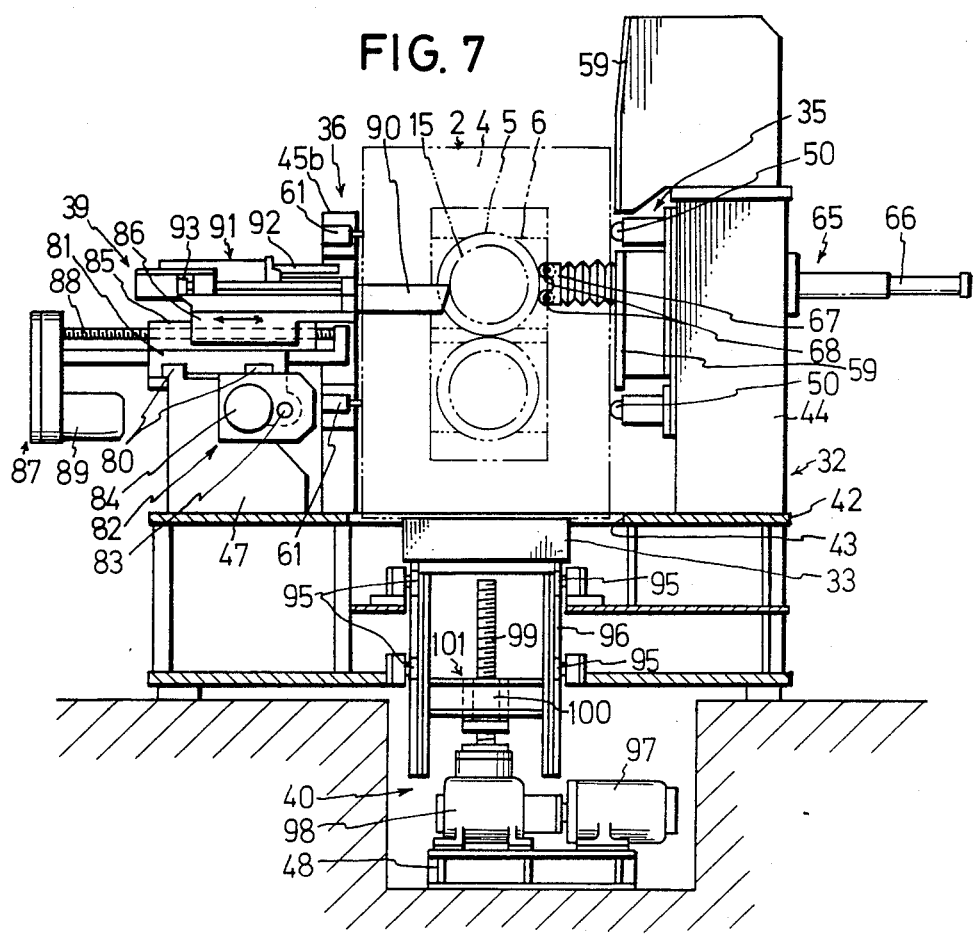
FIG. 7 is a longitudinal section of the roll cutting apparatus taken on a plane different from that of FIG. 6 while the upper roll is cut.
Figure 6:
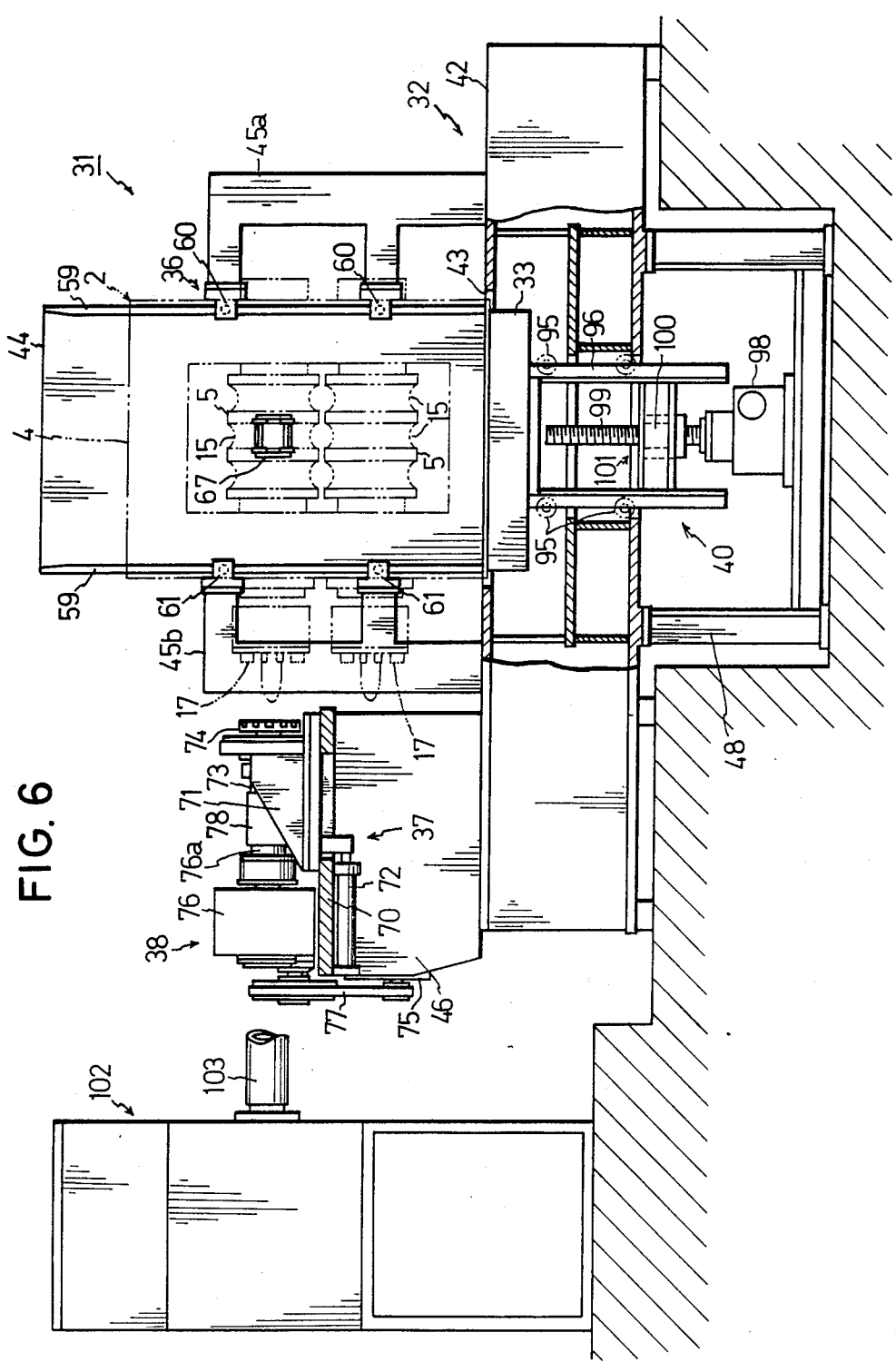
FIG. 6 is a longitudinal section of the roll cutting apparatus when a roll rotating apparatus is not yet connected with the roll stand.
Figure 10:
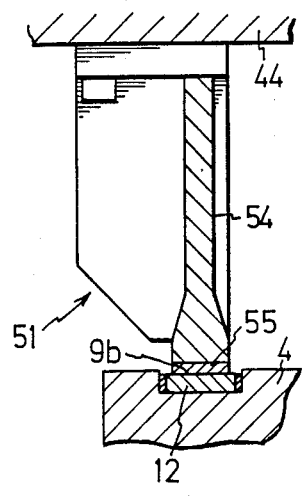
FIGS. 9, 10 and 11 are horizontal sections, each showing a relationship between a basing member of the roll cutting apparatus and a basing seat of the roll stand.
Figure 9:
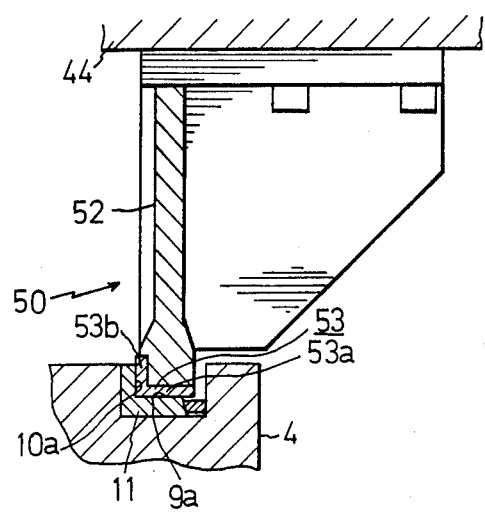

As shown in FIG. 4, basing members 50 and 51 for locating the housing 4 of the roll stand 2 are provided in the upper frame 44 with a horizontal separation therebetween. As shown in FIG. 7, two basing members 50 are provided at vertically different positions. The basing members 51 are similarly provided. The basing members 50 and 51 are shown in details in FIGS. 9 and 10 respectively. As shown in FIG. 9, the basing member 50 is formed by attaching a support seat 53 to the tip of a base member 52 secured on the upper frame 44. The support seat 53 consists of two support portions 53a and 53b connected perpendicularly to each other. As shown in FIG. 10, the basing member 51 is formed by attaching a support seat 55 to the tip of a base member 54. As shown also in FIG. 4, the upright frame 45a is provided with a basing member 56. Two basing members 56 are provided at vertically different positions. The basing member 56 is shown in details in FIG. 11. The basing member 56 is formed by attaching a support seat 58 to the tip of a base member 57 secured on the aforementioned upright frame 45a. These basing members 50, 51 and 56 constitute the aforementioned locating means 35. The support portion 53a and the support seat 55 function to locate the housing in the horizontal direction perpendicular to the axis of the roll 5 by receiving basing seats 9a and 9b of the housing 4 respectively. The support portion 53b and the support seat 58 function to locate the housing 4 in the horizontal direction parallel to the axis of the roll 5 by receiving basing seats 10a and 10b respectively. As shown in FIGS. 6 and 7, the upper frame 44 includes guide rails 59 between the upper and lower basing members and over the upper basing member.

As shown in FIGS. 4, 6 and 7, upright frames 45a and 45b are provided with pushers 60 and 61 respectively for pushing the housing 4 in the horizontal direction perpendicular to the axis of the roll 5. The upright frames 45b and 45c are provided with pushers 62 and 63 respectively for pushing the housing 4 in the horizontal direction parallel to the axis of the roll 5. These pushers 60 through 63 and the aforementioned basing members 50, 51 and 56 constitute the housing securing means 36.

As shown in FIGS. 4 and 7, a radial preload mechanism 65 is disposed in the upper frame 44. The mechanism 65 comprises a hydraulic cylinder 66 mounted on the upper frame 44 and an abutting member 67 attached to the piston rod of the hydraulic cylinder 66. The abutting member 67 is provided, at the front surface thereof, with a plurality of rotatable rollers 68 to be pressed onto the peripheral surface of the rolls 5. These rollers 68 are arranged and located so that they may be pressed onto the both edges of the groove 15 of the roll 5.

As shown in FIG. 6, a bearing member 71 is mounted on a linear rail 70 for movement along the rail which is secured on the mount 46 in the direction parallel to the axis of the roll 5. A hydraulic cylinder 72 mounted on the mount 46 is connected, at the piston rod thereof, to the bearing member 71 and is adapted to displace the bearing member 71 along the rail 70. The bearing member 71 supports rotatably a roll drive shaft 73 provided, at one end thereof, with a joint 74 for connection with the joint 17 of the roll 5. On the mount 46 are mounted an electric motor 75 and a reduction gear 76 combined with the output shaft of the electric motor 75 via a belt 77. The output shaft 76a of the reduction gear 76 is connected to the roll drive shaft 73 by an expansion joint 78.

When the cylinder 72 is expanded, the roll drive shaft 73 is displaced towards the roll stand 2 and the joint 74 joins with the joint 17 of the roll 5. Furthermore, the expansion force of the cylinder 72 is exerted on the roll 5 via the roll drive shaft 73 thereby to thrust the roll 5 in the axial direction thereof towards the housing 4. As a result, the roll 5 is brought near to the housing 4 in the axial direction and the play of the roll 5 against the housing 4 is eliminated. Namely, the roll 5 is located against the housing 4. The cylinder 72, bearing member 71 the roll drive shaft 73 and so on, effecting such locating operation, constitute the aforementioned roll locating means 37.

When the electric motor 75 is put into operation, the torque thereof is transmitted to the roll 5 via the belt 77, the reduction gear 76, the joint 78, the roll drive shaft 73 and so on and the roll 5 is rotated. These members constitute the aforementioned roll rotating means 38.

As shown in FIGS. 4 and 7, a carriage 81 is mounted for movement on linear rails 80 secured, in parallel with the axis of the roll 5, on the mount 47. This carriage 81 is transferred on the rail 80 by a feed apparatus 82. The feed apparatus 82 comprises a threaded shaft 83 mounted on the mount 47 in parallel with the linear rail 80 and an electric motor 84 for rotating the threaded shaft 83, which is in threaded engagement with a female screw mounted on the carriage 81. When the threaded shaft 83 is rotated by the electric motor 84, the carriage 81 is displaced along the rail 80. On the carriage 81 is mounted another linear rail 85 in the direction perpendicular to the linear rail 80. Another carriage 86 is mounted for displacement on the rail 85. This carriage 86 is transferred on the rail 85 by a feed apparatus 87 which is composed of a threaded shaft 88 and an electric motor 89 in the same manner as the feed apparatus 82 is composed. On the carriage 86 is detachably mounted a cutting tool 90, such as a bite, for cutting the roll 5. A roll position detecting apparatus 91 is mounted in the carriage 86 as well. The detecting apparatus 91 includes a detecting bar 92 which is mounted on the carriage 86 for forth and back movement in the direction parallel with the linear rail 85. The detecting bar 92 is advanced or retreated by a cylinder 93. The detecting bar 92 is engaged with a potentiometer. The potentiometer outputs an electric signal corresponding to the stroke which the detecting bar 92 takes until the tip of the detecting bar 92 contacts a portion of the roll 5 to be cut.

As shown in FIGS. 6 and 7, the aforementioned stand 33 is mounted on a lift frame 96 whose up and down movement relative to the machine bed 42 is guided by guide rollers 95 and can be raised or lowered through the opening 43. The elevator 40 comprises an electric motor 97 and a reduction gear 98 both mounted on the lower frame 48 and a ball screw mechanism 101. A male screw shaft or a threaded shaft 99 of the ball screw mechanism 101 is connected to the output shaft of the reduction gear 98. A female screw member 100 which is in threaded engagement with a threaded shaft 99 of the ball screw mechanism 101 is mounted on the lift frame 96. In the elevator 40 constructed in this manner, when the electric motor 97 is put in operation, the threaded shaft 99 is rotated in a normal or reverse sense via the reduction gear 98 and the lift frame 96 is moved upwards or downwards.

As shown in FIGS. 4 and 6, the cutting apparatus 31 includes also a vacuum suction apparatus 102 for withdrawing chips and one end of a suction hose 103 of the suction apparatus 102 is opened under the cutting tool 90.

Figure 11:
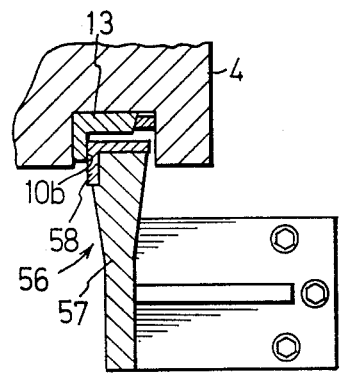

The repairing work of the roll 5 with use of the cutting apparatus 31 is now described. First of all, the roll stand 2 is dismounted from the rolling mill 1 and FIG. 1. The dismounted roll stand 2 is placed on the stand 33 of the cutting apparatus 31. When the roll is placed on the roll stand it is preferable to make the roll stand 2 lifted with a crane descend along the guide rails 59, with the pushers 60 through 63 contracted as shown in FIG. 4. After the roll stand 2 has been placed on the stand 33, it is allowed to ascend or descend thereby to bring either of the paired polls 5, the upper roll for example, to a position at the same height as the cutting tool 90. In the next place, the pushers 60 and 61 are expanded thereby to push the housing 4 of the roll stand 2 and to make the basing seats for works 9a and 9b abut the support portion 53a of the support seat 53 as shown in FIG. 9 and the support seat 55 as shown in FIG. 10. Then the pushers 62 and 63 are expanded thereby to push housing 4 and to make basing seats 10a and 10b abut the support portion 53b of the support seat 53 as shown in FIG. 9 and the support seat 58 as shown in FIG. 11. The housing 4 is thereby located in a prescribed positional relationship and secured to the base frame 32 of the cutting apparatus 31.

The cylinder 72 is now expanded thereby to make the joint 74 of the roll drive shaft 73 join with the joint 17 of the roll 5. The roll 5 is pushed in the axial direction thereof by the expansion force of the cylinder 72 and is located against the housing 4. Then the cylinder 66 of the radial preload mechanism 65 is expanded thereby to make the rollers 68 of the abutting member 67 abut the peripheral surface of the roll 5 at the side opposite to the cutting tool 90.

Now the roll 5 is rotated by putting the electric motor 75 of the roll rotating apparatus 38 in operation. With the roll 5 rotating, the cutting toll 90 is moved in the axial or radial direction of the roll 5 by transferring the carriage 81 or 86 and the groove 15 on the roll 5 is cut to the prescribed form. While the roll is cut, the radial force exerted by the cutting tool 90 on the roll 5 is compensated by the radial preload mechanism 65. As a result, the roll 5 is prevented from displacing radially against the housing 4. Namely, the roll 5 can be cut in the situation radially located as well.

The above mentioned cutting work may be done by controlling the respective rotation numbers of the electric motors 84 and 89 either automatically or manually. In the cutting work, the detecting bar 92 of the roll position detecting apparatus 91 is abutted on the surface of the roll 5 thereby to detect the position of the surface. The detected signal may be fed back to the control systems of the electric motors 84 and 89 thereby to control the movement of the cutting tool 90.

Figure 8:
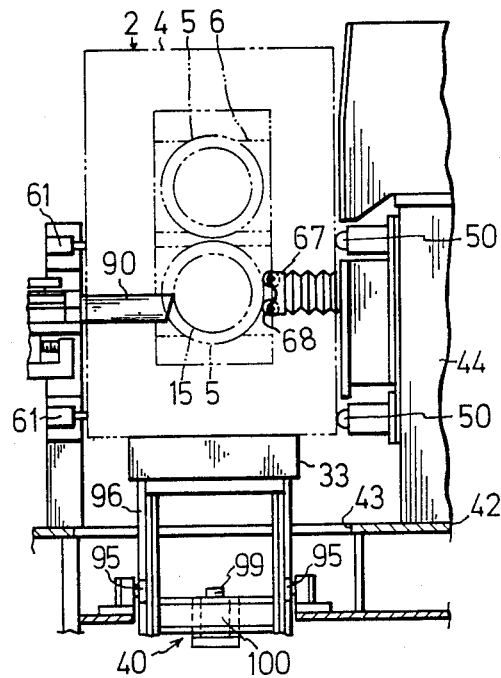
FIG. 8 is a partial longitudinal section showing the roll cutting apparatus while the lower roll is cut.

After the cutting work of the upper roll 5 has been completed, the roll drive shaft 73, the radial preload mechanism 65, the cutting tool 90 and so on are retreated and the pushers 60 through 63 are released. Then the stand 33 is raised by the elevator 40 and the lower roll 5 is brought to the vertical position same as that of the cutting tool 90 as shown in FIG. 8. The housing 4 is secured and the roll 5 is located similarly as in the above mentioned case. The lower roll 5 is cut in this situation.

After the upper and lower rolls have been cut, the roll drive shaft 73, the radial preload mechanism 65, the cutting tool 90 and so on are retreated and the securing of the housing 4 by the pushers 60 through 63 is released. Next, the roll stand 2 is lifted with the crane, removed from the stand 33 and is again mounted on the original rolling mill 1. The repairing work of the roll 5 is thus completed.

In the above mentioned embodiment, the vertical positions of the roll stand 2 are exchanged by raising or lowering the stand 33. However, the stand 33 may be fixed, with the other structures movable.

Figure 12:
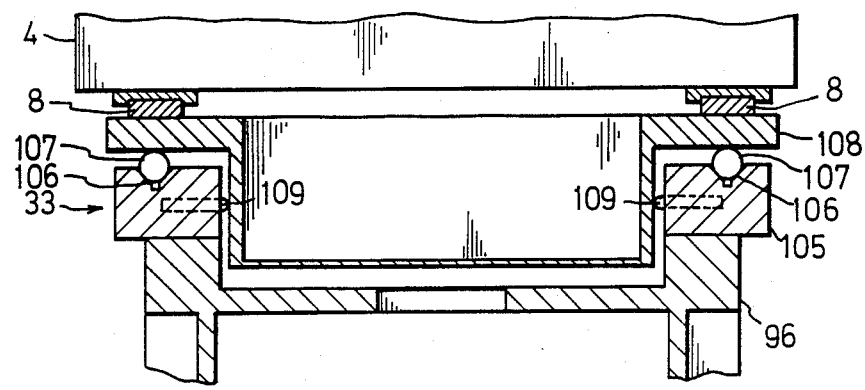
FIG. 12 is a logitudinal section showing a different embodiment of a stand for placing the roll stand thereon and FIGS. 13A through 13D are views for describing the conventional method of cutting roll.
Figure 13:
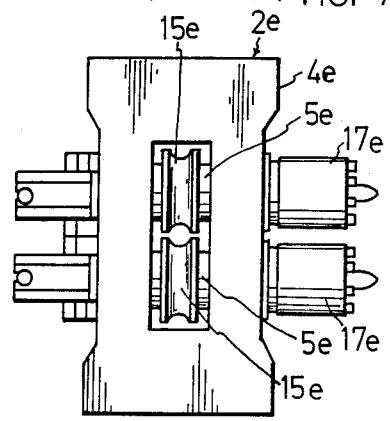
Figure 13:
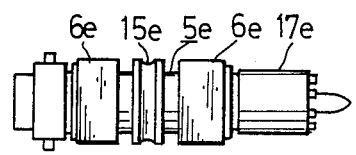
Figure 13:
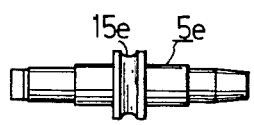
Figure 13:
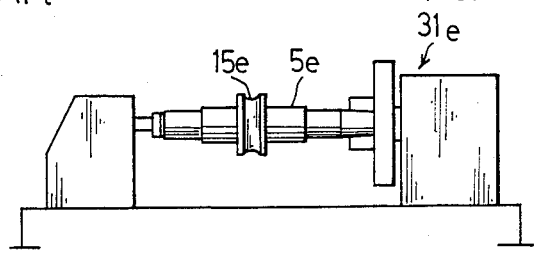

When the housing 4 of the roll stand 2 is horizontally moved thereby to be located, the housing 4 may be horizontally slid on the stand 33. However, it is more preferable to construct the stand 33 as shown in FIG. 12. Namely, in FIG. 12, a base 105 of the stand 33 is mounted on the lift frame 96. The base 105 is formed, on the upper surface thereof, with depressions 106 in which rollers 107 are rotatably set. A movable frame 108 for placing the housing 4 thereof is put on the rollers 107 and are horizontally movable relative to the base 105. The base 105 is provided with spring centering pins 109. The pin 109 has a biasing force to push the movable frame 108 horizontally. When the roll stand 2 is not placed on the movable frame 108, the pins 109 center the movable frame 108 at the middle of the range of motion of the frame.

When the housing 4 placed on the movable frame 108 is horizontally pushed by the aforementioned pushers 60 and 61 (or 62 and 63), the movable frame 108 on the rollers 107 is smoothly displaced in the horizontal direction relative the base 105.

As many apparently widely different embodiments of this invention may be made without departing from the spirit and scope thereof, it is to be understood that the invention is not limited to the specific embodiments thereof except as defined in the appended claims.

What is claimed is:
1. A roll cutting apparatus comprising:
  (a) a rolling mill having a dismountable roll stand including a housing of said roll stand and rolls having a shaft and rotatably mounted on said housing,
  (b) a base frame having a movable support portion for placing said roll stand with said housing thereon, said base frame further having a space for placing said roll stand therein over said support portion, said base frame including:
  (b) securing means securing said housing of said roll stand on said support portion, against said base frame,
  (c) roll locating means for bringing said rolls, in the axial direction of said roll, adjacent said housing and secured against said base frame for positioning said rolls against said housing,
  (d) roll rotating means secured against said base frame for rotating said rolls relative to said housing, and
  (e) a cutting tool secured against said base frame for cutting said rolls rotated by said roll rotating means relative to said housing.
2. The apparatus of claim 1 wherein said roll rotating means includes a first joint and a second joint joined to said first joint and mounted on one end of said shaft of the roll in said roll stand.
3. The apparatus of claim 6 wherein said movable support portion is mounted for horizontal movement relative to said base frame and the top surface of said movable support portion is the support portion associated with the base frame.

* * * * *